March 22, 1960　　　K. E. JAMES　　　2,929,124
SPIGOT MOLD FOR CONCRETE PIPES
Filed Oct. 4, 1954　　　2 Sheets-Sheet 1

KENNETH E. JAMES
INVENTOR.

BY *Hazard & Miller*

ATTORNEYS

March 22, 1960  K. E. JAMES  2,929,124
SPIGOT MOLD FOR CONCRETE PIPES
Filed Oct. 4, 1954  2 Sheets-Sheet 2

KENNETH E. JAMES
INVENTOR.

BY Hazard & Miller
ATTORNEYS

# United States Patent Office 2,929,124
Patented Mar. 22, 1960

2,929,124

SPIGOT MOLD FOR CONCRETE PIPES

Kenneth E. James, Baldwin Park, Calif., assignor to United Concrete Pipe Corporation, Baldwin Park, Calif., a corporation of California Application October 4, 1954, Serial No. 460,016

3 Claims. (Cl. 25—127)

This invention relates to improvements in molds for concrete pipes and the like.

Explanatory of the present invention conventional sections of concrete pipe, plastic pipe, cement asbestos pipe or pipe made from any plastic moldable material have a spigot molded or formed on one end and a bell formed at the opposite end so that in the course of assembling pipe sections the spigots may be inserted into bells of adjoining sections. In order to prevent leakage between the spigots and the bells, it has been desirable to core an annular groove on the exterior of the spigot which is designed and intended to receive a suitable gasket usually extruded from rubber or a rubber-like composition. Certain variations of the usual joint design require in addition to the gasket groove exterior spiral threaded portions of the spigot ends of the pipe.

It is old in the art to core out such grooves, threads and the like by employing a split metallic ring for this purpose. When such metallic ring is employed, the metallic ring is withdrawn from the mold along with the molded article. When the molded article has been recovered the split metallic ring is radially spread out of the groove and removed from the article, thus leaving a gasket groove molded in the exterior of the article. An objection to the use of a metallic split ring to core out the groove is that "flashing" occurs between the ends of the split ring. Also, it is quite difficult to remove the metallic ring from the groove inasmuch as in the course of removal of the metallic ring it frequently occurs that the walls of the groove become chipped. Chipping of the walls or breaking away the outer corners of the groove is objectionable and highly undesirable when the gasket is installed therein and sections of pipe are mutually assembled together.

A primary object of the present invention is to provide an improved means for molding or coring out a groove or other shape on the exterior of the spigot wherein an endless elastic ring is employed. This endless elastic ring can be given the shape to mold a gasket groove in the exterior of the spigot or other configuration, and when the pipe has been cast it can be removed or withdrawn from the mold along with the solidified pipe. Thereafter, it can be pulled from the groove and be radially stretched and slipped off of the pipe while in the stretched condition. By using an elastic ring for this purpose the ring may be endless, thus avoiding objectionable "flashing" as occurred between the ends of a split ring. Furthermore, in the course of removal of the elastic ring from the groove the ring on being radially stretched tends to thin or become somewhat narrower as considered in axial direction. This thinning or narrowing of the ring facilitates its removal from the groove and causes the ring to effectively pull away from the walls of the groove. This eliminates or avoids the objectionable chipping or breaking off of the outer corners. The endless elastic ring which forms or molds the groove may or may not be integral with the shaping ring, which imparts to the end of the pipe the shape of the spigot.

In the alternative, it may be detached from the shaping ring and merely molded thereon in such a manner as to be withdrawn along with the pipe as the pipe is being stripped from the mold. In the latter event, the shaping ring may be formed of metal and of sufficient cross sectional size and strength so that it will retain a truly circular shape, irrespective of the body of the mold. In this manner, the shape of the spigot can be kept truly round.

The use of the hereindescribed endless elastic coring ring is not limited to the coring of gasket grooves or thread configurations on the end of the pipe. It may also be used for the purpose of coring indentations around the circumference of any portion of the outer surface of the cylindrical pipe or the inner surface of special threaded bells. Spiral grooves around the outer circumference and up the bell slope of the pipe may be used for the purpose of properly positioning post-tension, prestressed wires in the course of the construction of non-cylinder prestressed pipe.

With the foregoing and other objects in view, which will be made manifest in the following detailed description and specifically pointed out in the appended claims, reference is had to the accompanying drawings for an illustrative embodiment of the invention, wherein:

Figure 1:
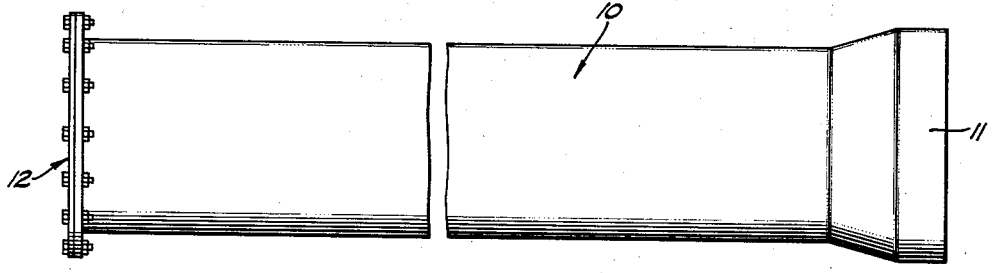
Figure 1 is a view in side elevation of an unsplit centrifugal mold which may be used in centrifugally casting concrete pipe, and in which the invention has been incorporated.

Referring to the accompanying drawings wherein similar reference characters designate similar parts throughout, there is illustrated in Fig. 1 a seamless mold 10 one end of which is enlarged as indicated at 11 and within which the bell of the pipe is formed. The other end of the mold 10 is partially closed by an end plate 12 and within this end of the mold the spigot end of the pipe is formed. This end plate is integral with a shaping ring which contours surfaces 13 and 13a. This shaping ring is preferably formed of metal and is sufficiently heavy in cross section that it will retain its truly round shape even though the relatively thin walls of the body of the mold 10 may become slightly distorted. Where the mold is of the seamless character the interior of the mold is coated with relatively thin coating of wax indicated at 14. The surfaces 13 of the shaping ring are oiled. The oil on the surface of the shaping ring prevents the concrete, used to cast the pipe, from adhering thereto in the course of setting. The shaping ring has its interior shaped to core the spigot end S of the pipe and intermediate its ends the shaping ring is provided with a shoulder 15 against which there is positioned an endless elastic ring 16. This ring is preferably formed of rubber or rubber-like material and projects inwardly from the shaping ring 13 so as to core out the groove G in the spigot S.

In utilizing this form of construction suitable reinforcing R is placed within the mold and concrete is also placed therein and the mold is rotated or spun about its longitudinal horizontal axis. The concrete is thrown out centrifugally against the walls of the mold and against the shaping ring so that a substantially uniform pipe thickness is molded or cast in and around the reinforcement R. When the concrete has set sufficiently so that it can be withdrawn from the mold the wax layer 14 is melted and is allowed to flow out of the mold, thus loosening the pipe within the seamless mold. The pipe can then be withdrawn from the mold, and in so doing the spigot S is caused to slide axially out of the shaping ring 13. During this sliding movement or withdrawal of the spigot S the coring ring or groove molding ring 16 is withdrawn from the shaping ring along with the pipe. The ring 16 is pulled out of the groove by stretching it radially and in the course of such stretching the ring tends to thin down or to narrow in axial thickness. Due to this thinning down or narrowing the ring will, in effect, pull away from the side walls of the groove G so that it can be removed without danger of breaking or chipping sides of the groove or chipping the corners of the groove. After the ring has been radially stretched in withdrawing it from the groove it may be slipped off of the end of the spigot and returned to the shaping ring in the mold for a subsequent molding or casting operation.

Figure 1A:
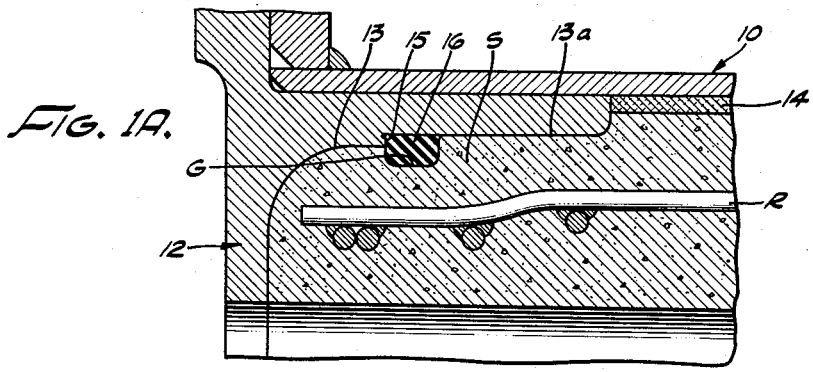
Fig. 1A is a partial view in vertical section on an enlarged scale of the spigot end of the mold shown in Fig. 1.
Figure 2:
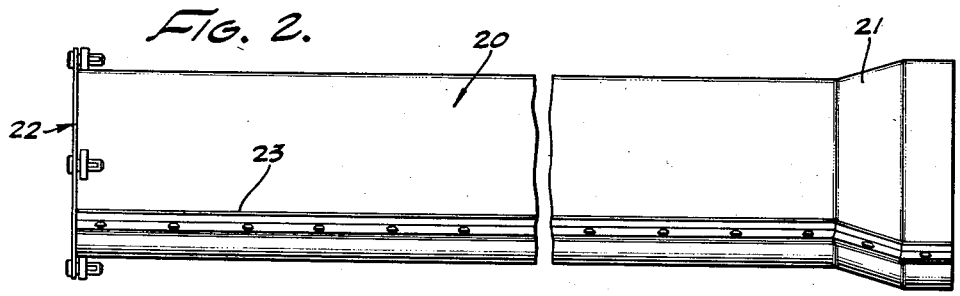
Fig. 2 is a view in side elevation of a split centrifugal mold which may be used in centrifugally casting concrete pipe, and in which the invention has been incorporated.
Figure 2A:
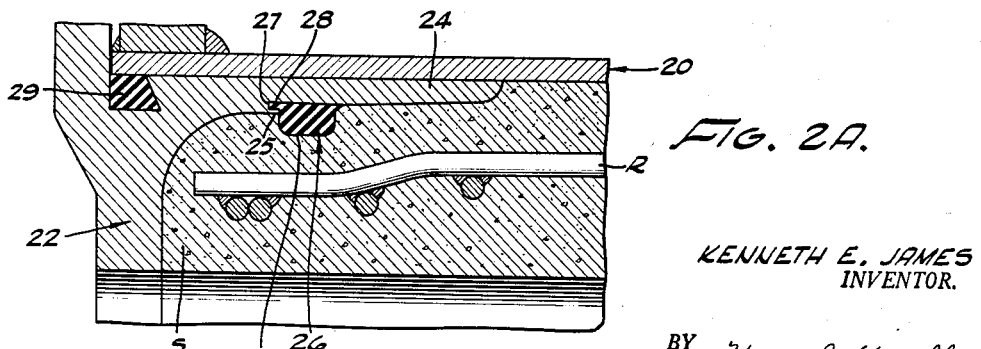
Fig. 2A is a partial view in vertical section on an enlarged scale of a portion of the mold shown in Fig. 2.

In Fig. 2 the mold 20 is also used for centrifugal casting of cement pipe. This mold has a bell end at 21 and an end plate 22 partially closing the opposite end of the mold. This mold is longitudinally split with a seam 23 which can be opened to open the mold and allow sufficient clearance for stripping. Consequently, in this form of construction it is unnecessary to employ the wax coating at 14. The walls of the mold as well as the shaping ring 24 need merely be oiled. In this construction the shaping ring is shown as being integral with the end plate 22 and has a shoulder thereon indicated at 25 against which the endless elastic groove shaping or coring ring 26 is positioned.

Where the pipe is of considerable diameter it is desirable to provide some means for retaining the endless elastic ring 26 against the shaping ring, and for this purpose the shoulder 25 is shown as being grooved as at 27 to receive a lip 28 on the endless elastic ring 26. When this lip extends into the groove it serves to retain the ring 26 in position so that the top of the ring 26 will not fall or pull away from the top of the shaping ring when the mold is stationary. If the pipe is of relatively small diameter and the ring 26 is of sufficiently stiff rubber the use of this lip and groove connection between the ring 26 and the shaping ring may be eliminated as illustrated in Fig. 1A. However, in either form of construction, if the diameter of the pipe is relatively large the lip and groove connection is preferably employed to prevent any collapse of the ring 26 prior to the filling of the mold. In this construction the reinforcement R is suspended in the mold and the concrete is placed while the mold revolves slowly, then the mold is rapidly spun or rotated about its horizontal longitudinal axis, causing the concrete to become evenly distributed about the interior of the mold. When the concrete has set sufficiently so that the pipe can be withdrawn from the mold the walls of the mold are opened and the pipe is pulled from within the shaping ring 24. In the course of pulling it from the shaping ring the endless rubber groove ring 26 is withdrawn from the shaping ring along with the pipe. The lip and groove connection at 27 and 28 does not interfere with the withdrawal of the ring 26 along with the pipe from the shaping ring 24. Thereafter, the ring 26 is radially stretched to withdraw it from the groove G and in so doing, the ring 26 will thin down or narrow, facilitating its removal from the groove. The ring 26 can then be slipped off the end of the spigot while in its stretched condition and returned to the shaping ring for a subsequent operation.

29 indicates a gasket that may be employed between the shaping ring and the walls of the mold to prevent leakage between the shaping ring and the walls of the mold.

Figure 3:
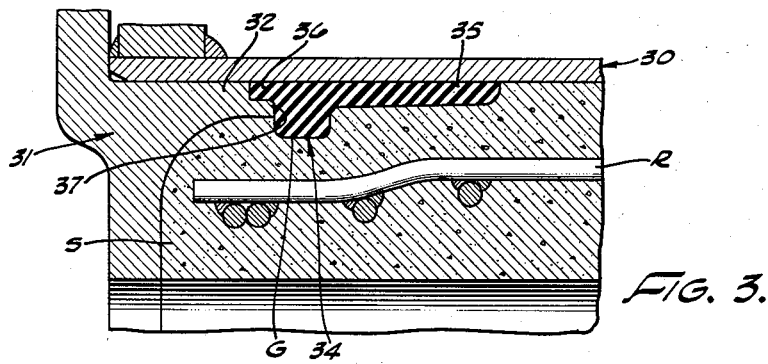
Fig. 3 is a view similar to Fig. 2A, but illustrating an alternative form of construction.

In Fig. 3 the centrifugal mold 30 is of the split type illustrated in Fig. 2, and is adapted to be rotated about its longitudinally extending central axis to centrifugally throw the concrete against the walls thereof. The end of this mold at which the spigot is formed is partially closed by an end plate 31 which is integral with a shaping ring 32. This shaping ring serves to shape only the outer end of the spigot S, the groove G being formed or cored out by the endless elastic ring 34 which is integral with the shaping portion 35 which shapes the rear portion of the spigot. The ring 34 has integral therewith a lip 36 which extends behind a flange 37 on the shaping ring 32 so as to retain the ring 34 and the portion 35 against the walls of the mold when the mold is not spinning. The concrete pipe is centrifugally cast in the mold as previously explained and upon opening the mold the spigot S is withdrawn from the shaping ring 32 and the ring 34 is withdrawn with it. Thereafter the ring 34 and the portion 35 are radially expanded and slipped off of the end of the pipe.

Figure 4:
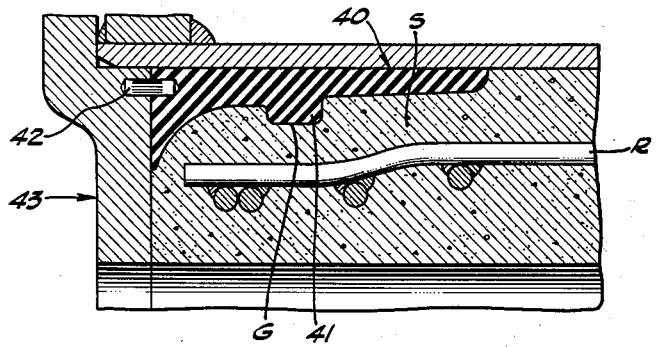
Fig. 4 is a view similar to Fig. 2A, but illustrating still another alternative form of construction.

In Fig. 4 the construction is substantially the same except that the shaping of the spigot S is performed entirely by an endless elastic rubber band 40 which has integral therewith a ring 41 which cores out and shapes the groove G. This band is held in position within the mold by means of dowels 42 mounted on the end plate 43. In this construction which can be used on either type of mold the band 40, together with its ring 41 are withdrawn from the mold along with the pipe after the concrete of the pipe has set. Thereafter, the shaping band and its integral ring are radially expanded to be slipped off the end of the pipe.

Figure 5:
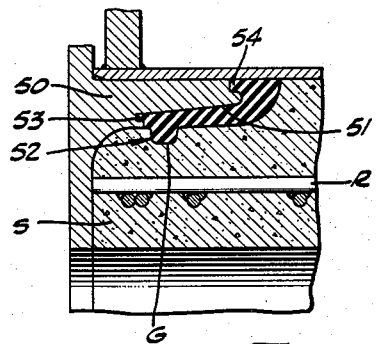
Fig. 5 is a view similar to Fig. 2A, but illustrating still another alternative form of construction.

In Fig. 5 the shaping ring 50 which forms the outer end of the spigot is shaped so as to be adaptable to either the wax type mold or the split mold and is shown as being integral with the end wall of the mold. The endless elastic band or ring which cores out or shapes the groove G is integral with a shaping portion 51 which shapes the remainder of the spigot. The ring 52, together with the shaping portion 51 have two flanges 53 and 54 which are recessed in the shaping ring 50 to retain the rubber band in position within the mold. These two lips or flanges do not interfere with the withdrawal of the ring 52 along with the pipe when the pipe is removed from the mold.

Figure 6:
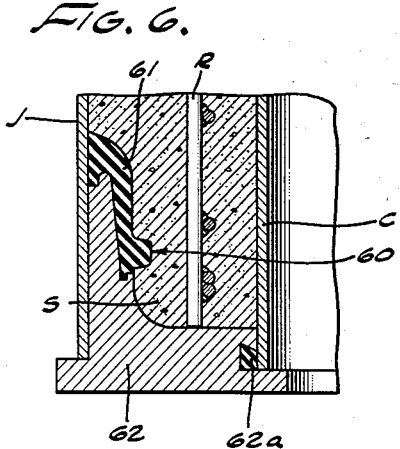
Fig. 6 is a partial view in vertical section of the bottom of a vertical form assembly illustrating the construction where the pipe is cast and vibrated in a vertical position with the spigot molded at the bottom of the form assembly by the base ring.

Figure 6 illustrates a construction which is desirable when the pipe is to be cast and vibrated in a vertical position with the spigot cast down. The endless elastic grooving ring 60 and its integral shaping portion 61 are mounted on the base ring 62, which determines the lower end of the pipe. The rubber O-ring gasket 62a produces a watertight seal between the base ring and the collapsible core C. The endless shaping and grooving ring 60 produces a similar seal between the base ring and the expandable jacket J at 61. To extract the pipe, the core and jacket must first be stripped; then withdrawal of the pipe along with the endless rubber spigot shaping ring, and the subsequent stretching of the elastic band during its removal from the pipe, is accomplished in substantially the same manner as previously described.

In the above described constructions it will be appreciated that where large sizes of pipe are to be molded or cast, that the coring or grooving ring has a mutually interfitting portion with that part of the mold which shapes one extreme end of the pipe. This interfitting portion holds the coring ring against collapse and against inward drooping under its own weight when the mold is in horizontal position in centrifugal casting. The interfitting relationship is such, however, that although the coring ring is held against axial displacement toward the extreme end of the pipe that is being shaped, the coring ring can nevertheless be withdrawn with the pipe from the mold in the opposite direction and radially expanded out of the groove that it cores and slipped over the end of the pipe.

Various changes may be made in the details of construction without departing from the spirit and scope of the invention as defined by the appended claims.

I claim:

1. In a mold for concrete pipe and the like, a shaping ring adapted to shape one end of the pipe, an endless elastic coring ring fitting against the shaping ring and arranged to core a groove extending circumferentially about the pipe inwardly of the extreme end of the pipe, said coring ring presenting a side in abutting relationship to the shaping ring for holding the coring ring against axial displacement toward said extreme end of the pipe and having at least one lip extending toward said extreme end of the pipe and fitting into a complementary groove in the shaping ring so that the coring ring will be held thereby against radially inward collapse, said coring ring being withdrawable from the shaping ring along with the cast pipe and being removable from the cast pipe by radially expanding it and slipping it over said extreme end.

2. In a mold for concrete pipe and the like, a shaping ring adapted to shape one end of the pipe, an endless elastic coring ring fitting against the shaping ring and arranged to core a groove extending circumferentially about the pipe inwardly of the extreme end of the pipe, said coring ring presenting a side in abutting relationship to the shaping ring for holding the coring ring against axial displacement toward said extreme end of the pipe, said coring ring and shaping ring having mutually interfitting portions for holding the coring ring against radially inward collapse and being withdrawable together with the cast pipe from the shaping ring whereby after the cast pipe is removed from the mold the coring ring may be radially expanded out of the groove cored in the cast pipe and slipped over said extreme end.

3. In a mold for concrete pipe and the like, a shaping ring adapted to shape one end of the pipe, an endless elastic coring ring fitting against the shaping ring and projecting inwardly therefrom so as to core a groove extending circumferentially about the pipe inwardly of the extreme end of the pipe, said coring ring presenting a side in abutting relationship to the shaping ring for holding the coring ring against axial displacement toward that end of the mold which shapes said extreme end of the pipe, said coring ring and shaping ring having mutually interfitting portions for holding the coring ring against radially inward collapse but which permit the coring ring to be withdrawn axially from the mold along with the molded pipe in a direction away from the shaping ring whereby the coring ring and pipe molded in the mold may be withdrawn together from the mold and the coring ring removed from the groove cored thereby by radially expanding it and slipping it over said extreme end of the pipe.

References Cited in the file of this patent

UNITED STATES PATENTS

| | | |
|---|---|---|
| 1,103,270 | Cronholm | July 14, 1914 |
| 1,584,595 | Bader | May 11, 1926 |
| 2,002,510 | Rosenblatt | May 28, 1935 |
| 2,337,998 | Karoff | Dec. 28, 1943 |
| 2,447,703 | Jenkins | Aug. 24, 1948 |
| 2,728,127 | Armstrong | Dec. 27, 1955 |